United States Patent
Okita et al.

(10) Patent No.: US 9,895,764 B2
(45) Date of Patent: Feb. 20, 2018

(54) RESISTANCE SPOT WELDING SYSTEM

(71) Applicant: JFE STEEL CORPORATION, Tokyo (JP)

(72) Inventors: Yasuaki Okita, Tokyo (JP); Chikaumi Sawanishi, Tokyo (JP); Rinsei Ikeda, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 0 days.

(21) Appl. No.: 14/773,017

(22) PCT Filed: Jan. 24, 2014

(86) PCT No.: PCT/JP2014/052181
§ 371 (c)(1),
(2) Date: Sep. 4, 2015

(87) PCT Pub. No.: WO2014/156290
PCT Pub. Date: Oct. 2, 2014

(65) Prior Publication Data
US 2016/0008914 A1      Jan. 14, 2016

(30) Foreign Application Priority Data

Mar. 29, 2013  (JP) ................. 2013-073415

(51) Int. Cl.
*B23K 11/11* (2006.01)
*B23K 11/25* (2006.01)

(52) U.S. Cl.
CPC ........... *B23K 11/115* (2013.01); *B23K 11/252* (2013.01); *B23K 11/255* (2013.01)

(58) Field of Classification Search
CPC .... B23K 11/115; B23K 11/252; B23K 11/255
(Continued)

(56) References Cited

U.S. PATENT DOCUMENTS 4,503,312 A * 3/1985 Nakata ................. B23K 11/255
                                                 219/110
4,745,255 A   5/1988 Mettier
(Continued)

FOREIGN PATENT DOCUMENTS

CN          101623793 A     1/2010
EP            2965848 A1    1/2016
(Continued)

OTHER PUBLICATIONS

Chen et al., Modeling and Fuzzy Control of the Resistance Spot Welding Process, Jul. 29-31, 1997, Proceedings of the 36th SICE Annual Conference, pp. 989-994.*
(Continued)

*Primary Examiner* — David Angwin
*Assistant Examiner* — John J Norton
(74) *Attorney, Agent, or Firm* — Oliff PLC

(57) ABSTRACT

A resistance spot welding system includes a calculation unit that calculate and store a time variation of an instantaneous amount of heat generated, a division unit that divides a current pattern into a plurality of steps and stores a time variation of the instantaneous amount of heat generated and a cumulative amount of heat generated for each step as a target value, and an adaptive control unit that starts welding upon subsequent actual welding using, as a standard, a time variation curve of the instantaneous amount of heat generated that is stored as the target value, and adjusts welding current and voltage during welding, when a time variation amount of an instantaneous amount of heat generated deviates during any step from the time variation curve by a difference, so as to compensate for the difference during a remaining welding time in the step.

1 Claim, 5 Drawing Sheets

(58) Field of Classification Search
USPC .......................................................... 219/91.1
See application file for complete search history.

(56) References Cited

U.S. PATENT DOCUMENTS

| | | | |
|---|---|---|---|
| 5,575,934 A * | 11/1996 | Takakuwa | B23K 11/257 |
| | | | 219/109 |
| 5,892,197 A * | 4/1999 | Goto | B23K 11/256 |
| | | | 219/110 |
| 6,057,523 A | 5/2000 | Fujii et al. | |
| 6,130,396 A | 10/2000 | Hasegawa et al. | |
| 2005/0218120 A1 | 10/2005 | Shih | |
| 2007/0119823 A1 | 5/2007 | Filev et al. | |
| 2007/0221629 A1 | 9/2007 | Fernandez et al. | |
| 2012/0248086 A1 * | 10/2012 | Watanabe | B23K 11/115 |
| | | | 219/162 |
| 2013/0337284 A1 * | 12/2013 | Onda | B23K 11/115 |
| | | | 428/594 |
| 2016/0008913 A1 * | 1/2016 | Okita | B23K 11/115 |
| | | | 219/86.7 |
| 2016/0236294 A1 * | 8/2016 | Sawanishi | B23K 11/115 |
| 2016/0271720 A1 * | 9/2016 | Sawanishi | B23K 11/115 |
| 2017/0113295 A1 * | 4/2017 | Sawanishi | B23K 11/252 |

FOREIGN PATENT DOCUMENTS

| | | |
|---|---|---|
| JP | H09-216071 A | 8/1997 |
| JP | H10-94883 A | 4/1998 |
| JP | H11-33743 A | 2/1999 |
| JP | 2010-221284 A | 10/2010 |
| JP | 2010-240740 A | 10/2010 |
| JP | 2010-247215 A | 11/2010 |
| WO | 2011/061623 A2 | 5/2011 |

OTHER PUBLICATIONS

Zhou et al., Online nugget diameter control system for resistance spot welding, Mar. 14, 2013, The International Journal of Advanced Manufacturing Technology, 68:2571-2588.*
Mar. 11, 2014 International Search Report issued in International Patent Application No. PCT/JP2014/052181.
Jun. 17, 2014 Office Action issued in Japanese Patent Application No. 2014-520087.
May 12, 2016 Search Report issued in European Patent Application No. 14772698.8.
Aug. 17, 2016 Search Report issued in Chinese Patent Application No. 201480019068.2.
Apr. 12, 2017 Office Action issued in Chinese Patent Application No. 201480019068.2.

* cited by examiner

Nugget diameter 5.1 mm  1 mm

Nugget diameter 5.0 mm  1 mm

Nugget diameter 4.0 mm  1 mm

Nugget diameter 5.6 mm  1 mm

RESISTANCE SPOT WELDING SYSTEM

TECHNICAL FIELD

This disclosure relates to a resistance spot welding system for multistep current passage in which the current pattern has two or more steps. In particular, this disclosure attempts to form a suitable nugget by utilizing adaptive control welding in each step.

BACKGROUND

Resistance spot welding, which is a type of lap resistance welding, is typically used to join overlapping steel sheets.

This welding method is a method to join two or more overlapping steel sheets by applying a high welding current for a short time between a pair of electrodes squeezing the steel sheets from above and below. A point-like weld is obtained using the resistance heat generated by passing the high-current welding current. Such a point-like weld is referred to as a nugget and is the portion where both of the overlapping steel sheets fuse and coagulate at a location of contact between the steel sheets when current is applied to the steel sheets. The steel sheets are joined in a point-like manner by this nugget.

In order to obtain good weld quality, it is important to form the nugget which has an appropriate diameter. The nugget diameter is determined by welding conditions such as the welding current, welding time, electrode shape, electrode force, and the like. Therefore, to form an appropriate nugget diameter, the above welding conditions need to be set appropriately in accordance with the conditions of materials to be welded, such as the material properties, sheet thickness, number of sheets overlapped, and the like.

For example, when manufacturing automobiles, spot welding is performed at several thousand points per automobile, and workpieces that arrive one after another need to be welded. At this time, if the conditions of materials to be welded, such as the material properties, sheet thickness, number of sheets overlapped, and the like are identical, then the welding conditions such as the welding current, welding time, electrode shape, electrode force, and the like are also identical. During consecutive welding, however, the surfaces of the electrodes in contact with the materials to be welded gradually wear, so that the contact area gradually expands beyond that of the initial state. If the same welding current as in the initial state is applied after the contact area has thus expanded, the current density in the materials to be welded lowers, and the temperature rise in the weld is reduced. The nugget diameter therefore decreases. Hence, for every several hundred to several thousand spots of welding, the electrodes are either dressed or replaced, so that the electrode tip diameter does not expand excessively.

A resistance welding device provided with a function (stepper function) to increase the welding current after welding a predetermined number of times, so as to compensate for the reduction in current density due to wear of the electrodes, has also been used conventionally. To use that stepper function, the above-described pattern for changing the welding current needs to be set appropriately in advance. Performing tests or the like, however, to derive a pattern for changing the welding current that corresponds to numerous welding conditions and conditions of materials to be welded is highly time-consuming and expensive.

The state of progress of electrode wear also varies during actual work. Therefore, the predetermined pattern for changing the welding current cannot always be considered appropriate.

Furthermore, when there is a disturbance at the time of welding, such as when a point that has already been welded (previously welded point) is located near the point being welded, or when the surface of the materials to be welded is highly uneven and a contact point between the materials to be welded is located near the point being welded, then current diverts to the previously welded point or the contact point. In such a state, the current density is reduced at the position to be welded directly below the electrodes, even when welding under predetermined conditions. A nugget of sufficient diameter therefore cannot be obtained.

In order to compensate for this insufficient amount of heat generated and to obtain a nugget of sufficient diameter, it becomes necessary to set a high welding current in advance.

Techniques such as the following have been proposed to resolve the above problem.

For example, JP H9-216071 A (PTL 1) discloses a control unit of a resistance welder that obtains a set nugget by comparing an estimated temperature distribution of the weld with a target nugget and controlling output of the welder.

JP H10-94883 A (PTL 2) discloses a method of controlling welding conditions of a resistance welder to achieve good welding by detecting the welding current and the voltage between tips, performing a simulation of the weld by heat transfer calculation, and estimating the formation state of the nugget.

Furthermore, JP H11-33743 A (PTL 3) discloses the achievement of a good weld, regardless of the type of materials being welded or the wear state of the electrodes, with a welding system that first uses the sheet thickness of the materials being welded and the welding time to calculate the cumulative amount of heat generated per unit volume that allows for good welding of the materials being welded and then adjusts the welding current or voltage that yields the calculated amount of heat generated per unit volume and unit time.

CITATION LIST

Patent Literature

PTL 1: JP H9-216071 A
PTL 2: JP H10-94883 A
PTL 3: JP H11-33743 A

With the resistance spot welding methods in PTL 1 and PTL 2, however, complicated calculations are necessary in order to estimate the temperature of the nugget based on a heat transfer model (heat transfer simulation) or the like. The structure of the welding control unit not only becomes complicated, but the welding control unit itself also becomes expensive.

The resistance spot welding system recited in PTL 3 always allows for good welding regardless of the degree of electrode wear by controlling the cumulative amount of heat generated to be a target value. When the set conditions of materials to be welded and the actual conditions of materials to be welded greatly differ, however, for example in cases such as when there is a disturbance nearby such as the aforementioned previously welded point, when the time variation pattern of the amount of heat generated changes greatly in a short period of time, or when welding hot-dip galvanized steel sheets with a large coating weight, then adaptive control cannot keep up, the necessary nugget diameter might not be obtained, or splashing may occur due to excessive heat input.

Furthermore, all of the techniques in PTL 1 to PTL 3 effectively address the change when the electrode tip wears, yet do not at all take into account the case of diversion having a large effect, such as when the distance from a previously welded point is short. Hence, there are concerns that adaptive control might not actually work.

It could therefore be helpful to propose a resistance spot welding system that can be applied to resistance spot welding by multistep current passage, that also effectively addresses wear of the electrode tip and the presence of a disturbance, and that can obtain a good nugget.

SUMMARY

We thus provide:

1. A resistance spot welding system for joining materials to be welded by squeezing the materials between a pair of electrodes and passing current while applying pressure, the materials being a plurality of overlapping metal sheets, the system comprising:

a calculation unit configured to calculate and store a time variation of an instantaneous amount of heat generated that is calculated from an electrical property between electrodes during test welding, preceding actual welding, that forms an appropriate nugget by passing current with constant current control;

a division unit configured to divide, based on the time variation of the instantaneous amount of heat generated, a current pattern into a plurality of steps in accordance with input from an external source after the test welding and to store a time variation of the instantaneous amount of heat generated and a cumulative amount of heat generated for each step as a target value; and an adaptive control unit configured to start welding upon subsequent actual welding using, as a standard, a time variation curve of the instantaneous amount of heat generated that is stored as the target value, and to adjust welding current and voltage during welding, when a time variation amount of an instantaneous amount of heat generated deviates during any step from the time variation curve by a difference, so as to compensate for the difference during a remaining welding time in the step and to generate an instantaneous amount of heat generated and a cumulative amount of heat generated in order to match the cumulative amount of heat generated that is the target value of the step.

2. The system of 1, further comprising:

a electrode force state change detector configured to detect a change of state in electrode force after welding starts, wherein the electrode force state change detector determines a timing of when the electrode force during the test welding reaches a designated value and inputs the timing as a time for dividing the current pattern into the plurality of steps.

Before actual welding, the materials to be welded are welded with constant current control in an ideal state (a state with no sheet gap, electrode core misalignment, or the like) to discover conditions for forming an appropriate nugget. This welding is treated as test welding, and the time variation of the instantaneous amount of heat generated during the welding is calculated and stored. Therefore, as long as regular resistance spot welding can be applied to the material, adaptive control-based resistance spot welding can be applied to any type of steel sheet upon the next welding.

The stored time variation of the instantaneous amount of heat generated is divided into two or more steps, and the time variation of the instantaneous amount of heat generated for each step, as well as a cumulative amount of heat generated, are newly stored as target values. The designation of timing for this division into a plurality of steps may be made by input from an external source. Therefore, by monitoring parameters during welding such as the current, voltage between electrodes, resistance between electrodes, distance between electrodes, electrode force, and the like, it is possible for the test welding to be divided into a plurality of steps easily at an appropriate timing desired by the operator based on the results of monitoring.

Furthermore, storing the time variation of the instantaneous amount of heat generated and the cumulative amount of heat generated as target values in each of the steps divided as above allows for the actual welding to be performed by multistep adaptive control welding, in which the cumulative amount of heat generated is guaranteed in each step. Therefore, wear of the electrode tip and the presence of a disturbance can also effectively be addressed, a good nugget can be obtained, and application of adaptive control welding to multistep resistance spot welding that requires multistep current passage becomes possible.

When further providing a electrode force state change detector that detects a change of state in electrode force after the start of welding, this electrode force state change detector measures the timing of when the electrode force during test welding reaches a designated value. By providing a function to input the obtained timing into the resistance spot control unit as the time for dividing the stored time variation of the instantaneous amount of heat generated during the test welding into the plurality of steps, it becomes possible to obtain the appropriate multistep division timing automatically when performing multistep adaptive control-based resistance spot welding that can stably ensure the necessary nugget diameter even for a workpiece in which the effect of a disturbance is great, such as when the dotting interval from a previously welded point is narrow.

DETAILED DESCRIPTION

Our system will be described in detail below.

In our resistance spot welding system, test welding is performed before the actual welding, and from an electrical property between electrodes when forming an appropriate nugget, the time variation of the instantaneous amount of heat generated as well as the cumulative amount of heat generated are calculated and stored. Based on the time variation of the instantaneous amount of heat generated, a current pattern is divided into a plurality of steps in accordance with input from an external source, and the time variation of the instantaneous amount of heat generated and the cumulative amount of heat generated for each step are stored as target values. During subsequent actual welding, when a time variation amount of the instantaneous amount of heat generated deviates during any step from the target value, adaptive control welding is utilized to compensate for the difference during the remaining welding time in the step so as to match the cumulative amount of heat generated of the actual welding to the cumulative amount of heat generated that was calculated during the test welding. Hence, wear of the electrode tip and the presence of a disturbance are also effectively addressed, and a good nugget is obtained.

First, our resistance spot welding system is described based on the drawings.

Figure 1:
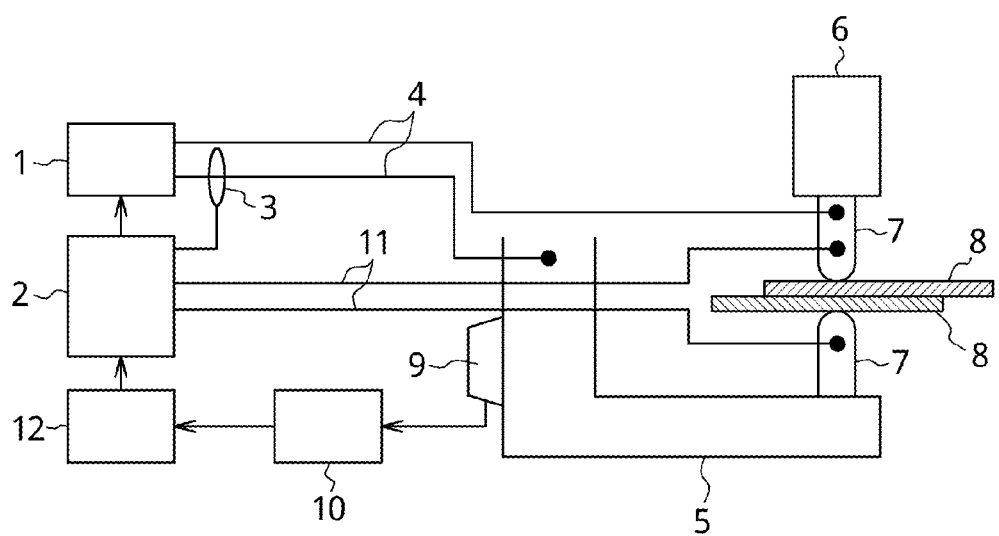
FIG. 1 is a structural diagram illustrating a preferred embodiment of our resistance spot welding system.

FIG. 1 illustrates the structure of our resistance spot welding system.

In FIG. 1, reference numeral 1 indicates a resistance spot welding power source, 2 indicates a control processor providing a control signal to the resistance spot welding power source 1, and 3 indicates a welding current detector that inputs a detected signal into the control processor 2. Reference numeral 4 indicates a secondary conductor that is connected to the output of the resistance spot welding power source 1 and is connected to electrodes 7 in order to pass current to the electrodes 7.

Reference numeral 5 indicates a lower arm and 6 indicates a pressure cylinder, to which respective electrodes 7 are attached. The materials to be welded 8 are squeezed by the electrodes 7. A strain sensor 9 is attached to the lower arm 5. Reference numeral 10 indicates an electrode force input processor that acts as an electrode force state change detector connected to the strain sensor 9. The electrode force input processor 10 is configured to allow for measurement of the change in the electrode force during welding by digitizing, with an A/D converter, the strain detected by the strain sensor 9 and calculating the electrode force from the strain amount of the arm when pressure is being applied.

Reference numeral 11 indicates inter-electrode voltage detection lines, attached to the electrodes 7, that enter the control processor 2. The control processor 2 can switch between a mode to perform test welding and a mode to perform actual welding.

In the test welding mode, the instantaneous amount of heat generated is calculated from the current that is input from the welding current detector 3 and the voltage that is input from the inter-electrode voltage detection lines 11, and the time variation of the instantaneous amount of heat generated is stored.

The stored time variation of the instantaneous amount of heat generated is divided into a plurality of steps at a timing that is input from an external input processor 12, and the time variation of the instantaneous amount of heat generated and a cumulative amount of heat generated are stored separately for each step as target values. The system may be configured so that input to the external input processor 12 is numeric input of the division timing from a user, or so that the timing of when the electrode force during welding reaches a designated value is automatically determined in the electrode force input processor 10 from collected data and is input automatically as a numerical value.

The designated electrode force is not limited to being one point. As necessary, the designated electrode force may be two points, three points, or more. The target of monitoring is not limited to the electrode force. As long as a change in a phenomenon during welding can be discerned, any of the following may be monitored: a change in distance between electrodes, a value from a servomotor encoder used in pressing, resistance, the amount of heat generated that is calculated from current, voltage, or other value by some sort of equation, or the like. Furthermore, monitoring a combination of a plurality of parameters to set many division timings is more effective, as doing so allows for adaptive control that is highly responsive to a change in a phenomenon during welding.

In the actual welding mode, current passage begins under the welding conditions for test welding. At this time, in the control processor 2, the instantaneous amount of heat generated is calculated for each sampling time from the current that is input from the welding current detector 3 and the voltage that is input from the inter-electrode voltage detection lines 11, and the instantaneous amount of heat generated is compared with the target value at each time. When a difference occurs between these two values, adaptive control welding is performed to control the welding current in accordance with the difference. In other words, so that the cumulative amount of heat generated in each step during actual welding matches the cumulative amount of heat generated in each step stored as a target value, the welding current is passed to the materials to be welded 8 after being adaptively controlled by the control processor 2 to compensate during a remaining welding time in the step.

Next, operations of this example are described.

First, test welding according to our system will be described.

A test on the same type of steel and thickness as the materials to be welded is performed by welding under a variety of conditions with constant current control in a state with no gap or diversion to a previously welded point. The welding conditions for obtaining a necessary nugget diameter, i.e. the appropriate electrode force F, welding time T, and welding current I, are thus discovered.

An inverter DC resistance spot welder is preferable as the welder, and chromium copper electrodes with DR-shaped tips may be advantageously adapted for use as the electrodes. Furthermore, the nugget diameter may be determined by a peel test or by cross-sectional observation at the nugget center (by etching with a saturated picric acid solution).

From the above experiment results, welding is performed in the test welding mode at the electrode force F, welding time T, and welding current I, and the time variation of the instantaneous amount of heat generated that is calculated from an electrical property between electrodes during the welding is stored, completing the test welding.

In this disclosure, the electrical property between electrodes refers to the resistance between electrodes or the voltage between electrodes.

Next, the current pattern is divided into two or more steps. By dividing into four, five, or more steps, adaptive control that is highly responsive to a change in a phenomenon during welding can be performed, yet a desired effect can be obtained with just two or three steps. Therefore, taking practicality into account, the cases of dividing into two and three steps are described.

Division into Two Steps

The time when the weld forms between steel sheets is preferably used as the dividing point. This is the point between the beginning of weld formation between the steel sheets and the subsequent process of nugget growth.

The reason is that the effect of diversion to a previously welded point is large up to the time a stable current path (weld) is formed directly below the electrodes, and therefore performing adaptive control welding to guarantee the cumulative amount of heat generated per unit volume up until the weld is formed allows for a stable current path to be formed even if a previously welded point is located nearby and allows for stable nugget growth in the subsequent second step.

The timing at which the weld begins to form between the steel sheets can be determined by observation through a peel test, or through cross-sectional observation of the weld, after welding by changing the welding time.

Division into Three Steps

When the materials to be welded are coated steel sheets, three-step division that takes fusion of the coating into account is more preferable. The reason is that when coating is present, the effect of diversion is large, resulting in a large change in the phenomenon up until a stable current path forms directly below the electrodes. Since the melting point of the coating is lower than that of the steel sheets, the coating between the steel sheets first fuses after passage of current begins, and a portion of the fused coating is expelled from between the steel sheets due to the electrode force. The coating that is expelled at this time expands the current conducting area, thereby greatly reducing the resistance between electrodes during welding. Conversely, the specific resistance of the materials to be welded increases along with a rise in temperature. Therefore, the specific resistance increases as the welding time lengthens, and after the decrease in resistance between electrodes due to the expanded current conducting area, an increase in the resistance between electrodes occurs due to the rise in temperature of the materials to be welded. Subsequently, the weld forms. Therefore, dividing the welding process into three steps, i.e. the step in which the coating fuses and the current conducting area expands suddenly, the step up until a stable current path (weld) forms between the electrodes due to subsequent passage of current, and the subsequent nugget formation step, and then performing, in each step, adaptive control welding to guarantee the cumulative amount of heat generated per unit volume allows for a stable current path to be formed by resistance spot welding of coated steel sheets, even if a previously welded point is located nearby. This approach also allows for stable nugget growth in the subsequent third step.

Performing multistep adaptive control divided into multiple steps so as to correspond to a change in the welding state, as described above, allows for a nugget with the necessary diameter to be obtained stably even for a workpiece in which the effect of a disturbance is great. The time variation of the instantaneous amount of heat generated that is stored in the test welding is divided at the timing input from the external input processor 10, and the time variation of the instantaneous amount of heat generated and a cumulative amount of heat generated are stored for each step as target values. Regarding the timing for division into multiple steps, it suffices to weld while changing the welding time using the same electrode force F and welding current I as for the test welding and then to discover the timing of the change in welding state by cross-sectional observation or a peel test. Another effective method is to monitor the resistance between electrodes, voltage between electrodes, distance between electrodes, electrode force, or the like during welding and determine the timing from the change in these factors.

As an example, the case of using a change in electrode force during welding as an index of the timing for division into multiple steps is described. The change in electrode force during welding can be measured with the strain sensor 9 attached to the lower arm 5. In typical resistance spot welding, upon the start of current passage, the area near the weld undergoes thermal expansion due to the temperature rise in the weld. As a result, the gap between the clamping electrodes is expanded by force, and the substantial electrode force increases. The electrode force then exhibits a waveform pattern with a peak, after which the electrode force decreases due to the electrode sinking into the materials to be welded as a result of formation of the weld and softening of the materials. Therefore, the point in time indicating the peak can be considered the timing at which a stable current path is formed. The welding system may be configured so that during welding in the test welding mode, the timing for obtaining the maximum electrode force during welding is determined automatically by the electrode force input processor 10 from collected data, with the resulting numerical value being automatically input into the external input processor 12. This approach yields target values for instantaneous amount of heat generated and cumulative amount of heat generated effectively divided into multiple steps.

Next, the actual welding is performed.

The actual welding is started using, as a standard, a time variation curve of the instantaneous amount of heat generated that is obtained by the test welding, and in each of the steps, when the time variation amount of the instantaneous amount of heat generated follows the time variation curve that is the standard, welding is performed as is to completion.

When the time variation amount of the instantaneous amount of heat generated deviates during any step from the time variation curve that is the standard, however, adaptive control welding is performed to control the current passage amount in response to the difference, thereby compensating during the remaining welding time in the step so that the cumulative amount of heat generated in the actual welding matches the cumulative amount of heat generated determined in advance in the test welding.

In this way, the necessary cumulative amount of heat generated is guaranteed even when the electrode tip wears or when a disturbance is present, thereby yielding an appropriate nugget diameter.

While the method of calculating the amount of heat generated is not limited, PTL 3 discloses one example, which is used in this disclosure. The amount of heat generated per unit volume and the cumulative amount of heat generated per unit volume can be treated as target values.

The cumulative amount of heat generated Q per unit volume is calculated with this method as follows.

Let the total thickness of the two materials to be welded be t, the electrical resistivity of the materials to be welded be r, the voltage between electrodes be V, the welding current be I, and the area of contact between the electrodes and the materials to be welded be S. In this case, the welding current passes through a columnar portion with a cross-sectional area S and thickness t, generating resistance heat. The amount of heat generated q per unit volume and unit time in this columnar portion is determined with Equation (1) below.

$$q=(V \cdot I)/(S \cdot t) \quad \text{Equation (1):}$$

The electrical resistance R of this columnar portion is calculated with Equation (2) below.

$$R=(r \cdot t)/S \quad \text{Equation (2):}$$

By solving for S in Equation (2) and substituting into Equation (1), the amount of heat generated q is given by Equation (3) below.

$$q=(V \cdot I \cdot R)/(r \cdot t^2)=(V^2)/(r \cdot t^2) \quad \text{Equation (3):}$$

As is clear from Equation (3) above, the amount of heat generated q per unit volume and unit time can be calculated from the voltage between electrodes V, total thickness t of materials being welded, and electrical resistivity r of the materials being welded. Therefore, the amount of heat generated q is not affected by the area S of contact between the electrodes and the materials being welded.

In Equation (3), the amount of heat generated is calculated from the voltage between electrodes V, yet the amount of heat generated q may also be calculated from the current between electrodes I. In this case as well, the area S of contact between the electrodes and the materials being welded need not be used.

Accumulating the amount of heat generated q per unit volume and unit time over the entire welding time period yields the cumulative amount of heat generated Q per unit volume that is added during welding. As is clear from Equation (3), this cumulative amount of heat generated Q per unit volume can also be calculated without using the area S of contact between the electrodes and the materials being welded.

The case of calculating the cumulative amount of heat generated Q using the method disclosed in PTL 3 has been described, yet other methods of calculation may of course be used.

Examples of the disturbance referred to in this disclosure include the above-described presence of a previously welded point near the welding point or contact point between the materials to be welded, as well as wear of the electrodes or the like.

The test welding has been described as being performed in a state without disturbances such as previously welded points. Performing the test welding in a state with a previously welded point, however, poses no problem whatsoever, as doing so reduces the difference between the conditions of test welding and actual welding, thereby facilitating effective performance of adaptive control.

EXAMPLES

Example 1

Mild steel (thickness: 1.6 mm) was prepared as the materials to be welded. The welding current was passed with a two-step current passage method.

Two sheets of the materials to be welded were overlapped and welded with constant current control in a state with no gap or diversion to a previously welded point. The welding conditions for obtaining a suitable nugget diameter were thus obtained. An inverter DC resistance spot welder was used as the welder, and chromium copper electrodes with 6 mm face diameter DR-shaped tips were used as the electrodes. For the welding conditions, an electrode force of 3.43 kN (350 kgf) and a welding time of 16 cyc (50 Hz (hereinafter, time units all refer to the number of cycles at 50 Hz)) were kept constant, and the welding current was changed to a variety of settings to determine the current at which a nugget diameter of $4\sqrt{t}$ (t: sheet thickness) was obtained. In this example, the appropriate nugget diameter is $4\sqrt{t}=5.1$ mm.

As a result, it was determined that a nugget diameter of approximately 5.1 mm is obtained at a welding current of 6.2 kA. Test welding was performed at an electrode force of 3.43 kN, a welding time of 16 cyc, and a welding current of 6.2 kA, and the time variation of the instantaneous amount of heat generated per unit volume was stored.

Figure 2A:
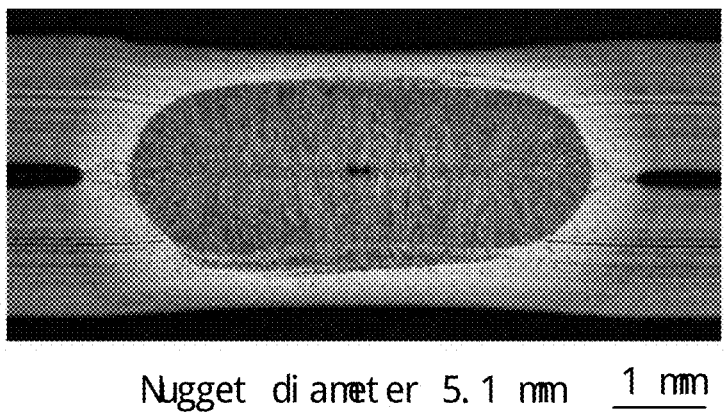
FIG. 2(a) is a weld cross-section when performing test welding.
Figure 2B:
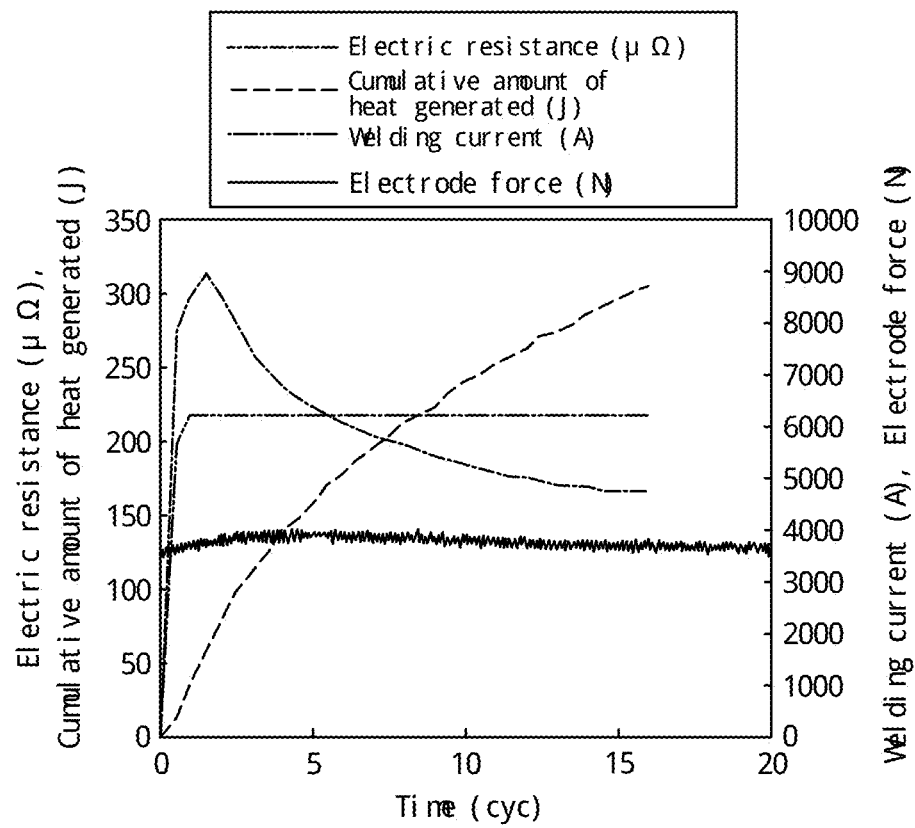
FIG. 2(b) illustrates the corresponding change over time of the welding current, electrical resistance, cumulative amount of heat generated, and electrode force.

FIG. 2(a) illustrates a weld cross-section when performing this test welding, and FIG. 2(b) illustrates the corresponding change over time of the welding current, electrical resistance, cumulative amount of heat generated, and electrode force.

Next, from the results of monitoring the electrode force, current, and voltage during the test welding, the timing for dividing the welding process into two steps was set to 4 cyc, which indicates the peak of the electrode force during the welding, and was input from the external input processor 12 into the control processor 2. With the time up to 4 cyc as the first step and 4 cyc to 16 cyc as the second step, the time variation of the instantaneous amount of heat generated per unit volume and the cumulative amount of heat generated per unit volume were stored as target values for each step.

In this case, the target cumulative amount of heat generated that was obtained in the test welding was 138 J for the first step and 167 J for the second step. Therefore, the final target cumulative amount of heat generated was 305 J.

Next, the actual welding was performed under the following conditions.

Multistep adaptive control resistance spot welding according to our system was performed with the above test welding as a standard, under the conditions of a previously welded point present near the welding point (distance between centers of points: 7.5 mm) and a large effect of diversion. In other words, resistance spot welding was performed using, as a standard, the time variation curve of the instantaneous amount of heat generated per unit volume obtained by test welding.

Figure 3A:
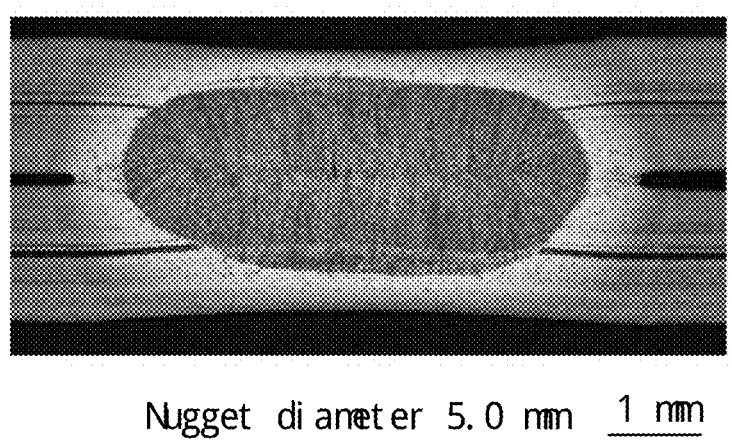
FIG. 3(a) is a weld cross-section when performing two-step adaptive control welding.
Figure 3B:
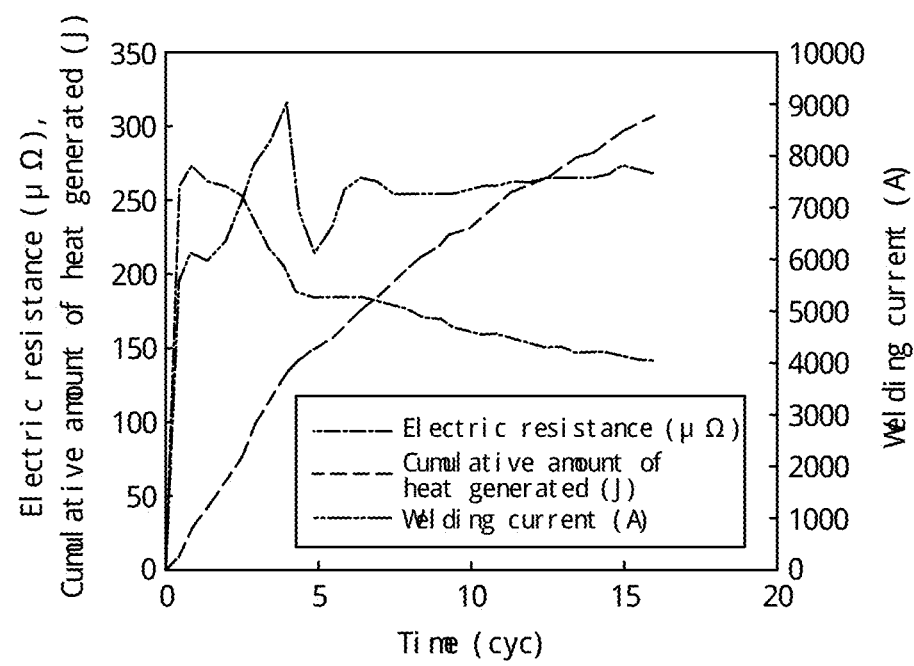
FIG. 3(b) illustrates the corresponding change over time of the welding current, electrical resistance, and cumulative amount of heat generated.

FIG. 3(a) illustrates a weld cross-section at that time, and FIG. 3(b) illustrates the change over time of the welding current, electrical resistance, and cumulative amount of heat generated.

For comparison, resistance spot welding with constant current control (Comparative Example 1) and adaptive control welding with conventional one-step current passage were performed under the condition of a previously welded point present near the welding point (distance between centers of points: 7.5 mm). The constant current control welding was performed under the conditions of an electrode force of 3.43 kN (350 kgf), welding time of 16 cyc, and welding current of 6.2 kA. The adaptive control welding with conventional one-step current passage was performed under the condition of a previously welded point being present while using, as a standard, test welding with one-step current passage performed under the conditions of an electrode force of 3.43 kN (350 kgf), welding time of 16 cyc, welding current of 6.2 kA, and the absence of previously welded points.

Figure 4A:
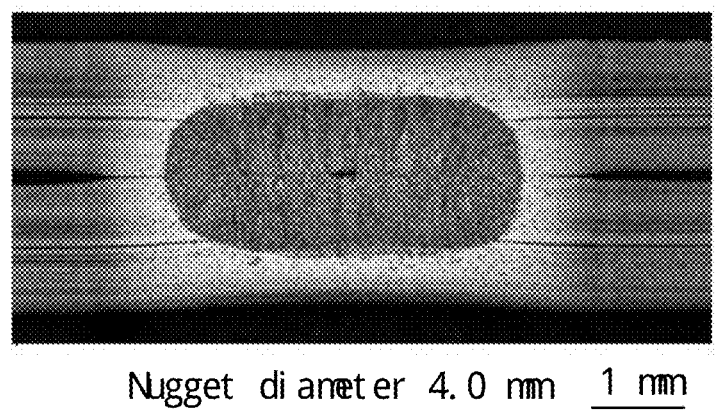
FIG. 4(a) is a weld cross-section when performing conventional constant current control welding.
Figure 4B:
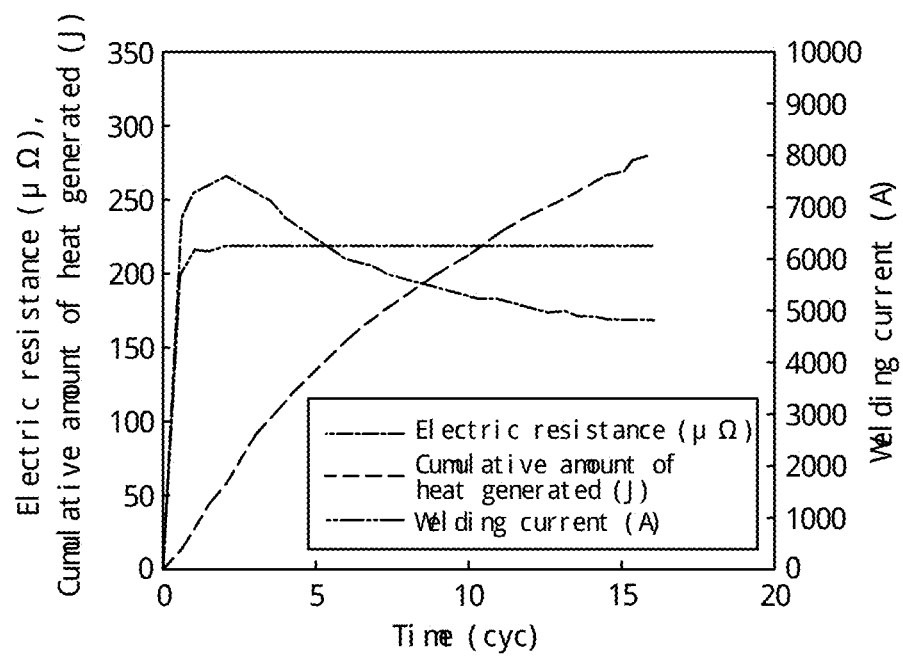
FIG. 4(b) illustrates the corresponding change over time of the welding current, electrical resistance, and cumulative amount of heat generated.

FIG. 4(a) illustrates a weld cross-section when performing constant current control welding, and FIG. 4(b) illustrates the corresponding change over time of the welding current, electrical resistance, and cumulative amount of heat generated.

Figure 5A:
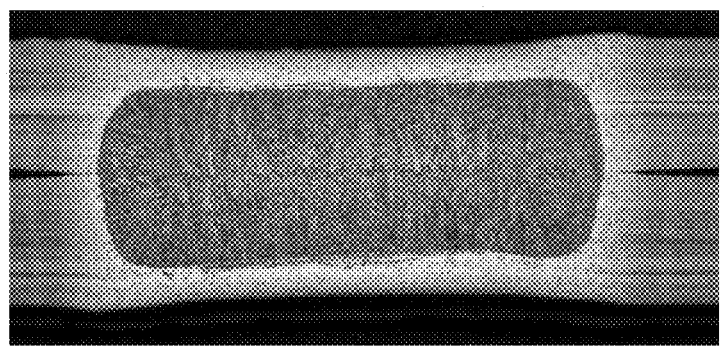
FIG. 5(a) is a weld cross-section when performing conventional one-step adaptive control welding.
Figure 5B:
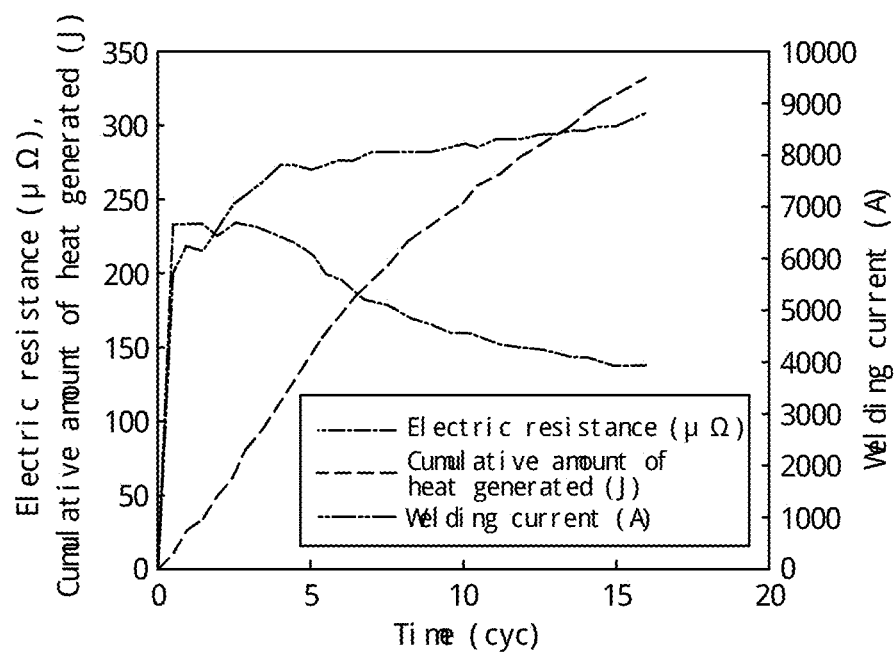
FIG. 5(b) illustrates the corresponding change over time of the welding current, electrical resistance, and cumulative amount of heat generated.

FIG. 5(a) illustrates a weld cross-section when performing adaptive control welding with conventional one-step current passage, and FIG. 5(b) illustrates the corresponding change over time of the welding current, electrical resistance, and cumulative amount of heat generated.

As is clear from FIG. 3(a), in the case of the Example, the current greatly changed so that the cumulative amount of heat generated became equivalent to the case of the test welding. As a result, the obtained nugget had a nugget diameter of 5.0 mm, nearly the target diameter.

In the Example, in particular in the earlier part of the first step, an insufficient amount of heat generated was observed due to the effect of diversion caused by the previously welded point, yet it is clear that in the latter part of the first step, the welding current was increased to compensate for this insufficiency, thus guaranteeing the target amount of heat generated.

In the actual welding, the cumulative amount of heat generated was 135 J in the first step and 172 J in the second step. The resulting cumulative amount of heat generated of 307 J thus nearly equaled that of the test welding.

Conversely, in the constant current control welding of Comparative Example 1, the total heat input was insufficient due to diversion, and only a nugget with a small diameter of 4.0 mm was obtained.

During the adaptive control welding with conventional one-step current passage, the current control could not keep pace with the change in the welding phenomenon, and the cumulative amount of heat generated grew larger than that of the test welding. The nugget diameter of 5.6 mm was too large, and a state in which splashing occurred easily was reached.

Next, Table 1 compares the cumulative amount of heat generated in the first step (up to the fourth cycle) for the test welding, two-step adaptive control welding according to our system, conventional constant current control welding, and conventional one-step adaptive control welding.

TABLE 1

|  | Test welding | Example (two-step adaptive control) | Comparative Example 1 (constant current control) | Comparative Example 2 (one-step adaptive control) |
|---|---|---|---|---|
| Cumulative amount of heat generated up to fourth cycle | 138 J | 135 J | 113 J | 113 J |

As indicated in Table 1, in the Example, up to the fourth cycle it was possible to provide a cumulative amount of heat generated equivalent to the cumulative amount of heat generated in the test welding, whereas with the constant current control welding of Comparative Example 1, a reduction in the amount of heat generated due to diversion was observed. It is also clear that in the conventional one-step adaptive control welding, only an amount of heat generated equivalent to that of constant current control welding could be provided, despite performing adaptive control.

REFERENCE SIGNS LIST

1: Resistance spot welding power source
2: Control processor providing control signal to resistance spot welding power source
3: Welding current detector
4: Secondary conductor connected to output of resistance spot welding power source
5: Lower arm
6: Pressure cylinder
7: Electrode
8: Materials to be welded
9: Strain sensor
10: Electrode force input processor
11: Inter-electrode voltage detection line
12: External input processor

The invention claimed is:

1. A resistance spot welding system for joining materials to be welded, the materials being a plurality of overlapping metal sheets, the resistance spot welding system comprising:
   a pair of electrodes configured to squeeze the materials therebetween;
   a resistance spot welding power source configured to pass current to the pair of electrodes while applying pressure to the materials;
   a first processor configured to:
      (i) calculate a time variation of an instantaneous amount of heat generated that is calculated from a resistance or a voltage between the pair of electrodes during test welding, preceding actual welding, that forms a nugget of an appropriate diameter by passing current with constant current control, and (ii) store the time variation of the instantaneous amount of heat generated as a time variation curve of the instantaneous amount of heat generated;
      divide, based on the stored time variation curve of the instantaneous amount of heat generated, a current pattern into a plurality of steps and to store a cumulative amount of heat generated for each step; and
      start the actual welding of nuggets of the appropriate diameter using the stored time variation curve as a target, and to adjust welding current and voltage during welding, when a time variation amount of an instantaneous amount of heat generated measured during the actual welding deviates during any step of the plurality of steps from the stored time variation curve by a difference, so as to compensate for the difference during a remaining welding time in the step and to generate a cumulative amount of heat generated in the step of the actual welding in order to match the stored cumulative amount of heat generated in the step of the test welding; and
   a second processor configured to detect a change of state in electrode force after welding starts,
   wherein the second processor determines a timing of when the electrode force during the test welding reaches a designated value and inputs the timing as a time for dividing the current pattern into the plurality of steps.

* * * * *